United States Patent [19]
Hartwell

[11] 3,820,395
[45] June 28, 1974

[54] FLOWMETER

[76] Inventor: Robert Edward Hartwell, 10 Parlee Rd., Chelmsford, Mass. 01824

[22] Filed: May 1, 1972

[21] Appl. No.: 249,343

[52] U.S. Cl. .............................. 73/231 R, 73/195
[51] Int. Cl. ............................................. G01f 1/10
[58] Field of Search........... 73/231 R, 195; 324/166, 324/173, 174, 178

[56] References Cited
UNITED STATES PATENTS

| | | | |
|---|---|---|---|
| 3,372,591 | 3/1968 | Clinton et al. ................. | 73/231 R |
| 3,534,602 | 10/1970 | Boyd .............................. | 73/231 R |
| 3,710,246 | 1/1973 | Herring .......................... | 324/162 |

OTHER PUBLICATIONS

"Accurate Tachometry Methods With Electronic Counters," By Shulman, from A.I.E.E. Transactions Vol. 73 Pt. 1, pp. 452-455, 11-54.

"Hybrid System For Measurement or Control of Velocity," By Akins et al., from IBM Technical Disclosure Bulletin, Vol. 11 No. 8, 1-69, pp. 1033-1034.

*Primary Examiner*—James J. Gill
*Attorney, Agent, or Firm*—Edward J. Norton; William Squire

[57] ABSTRACT

A flowmeter is provided for accurately measuring the flow rates of slow moving fluids in a short time duration from the start of the measurement by determining the actual time interval for one or more integral revolutions of a turbine disposed in the fluid and measuring that time interval by means of a clock and counting device.

5 Claims, 1 Drawing Figure

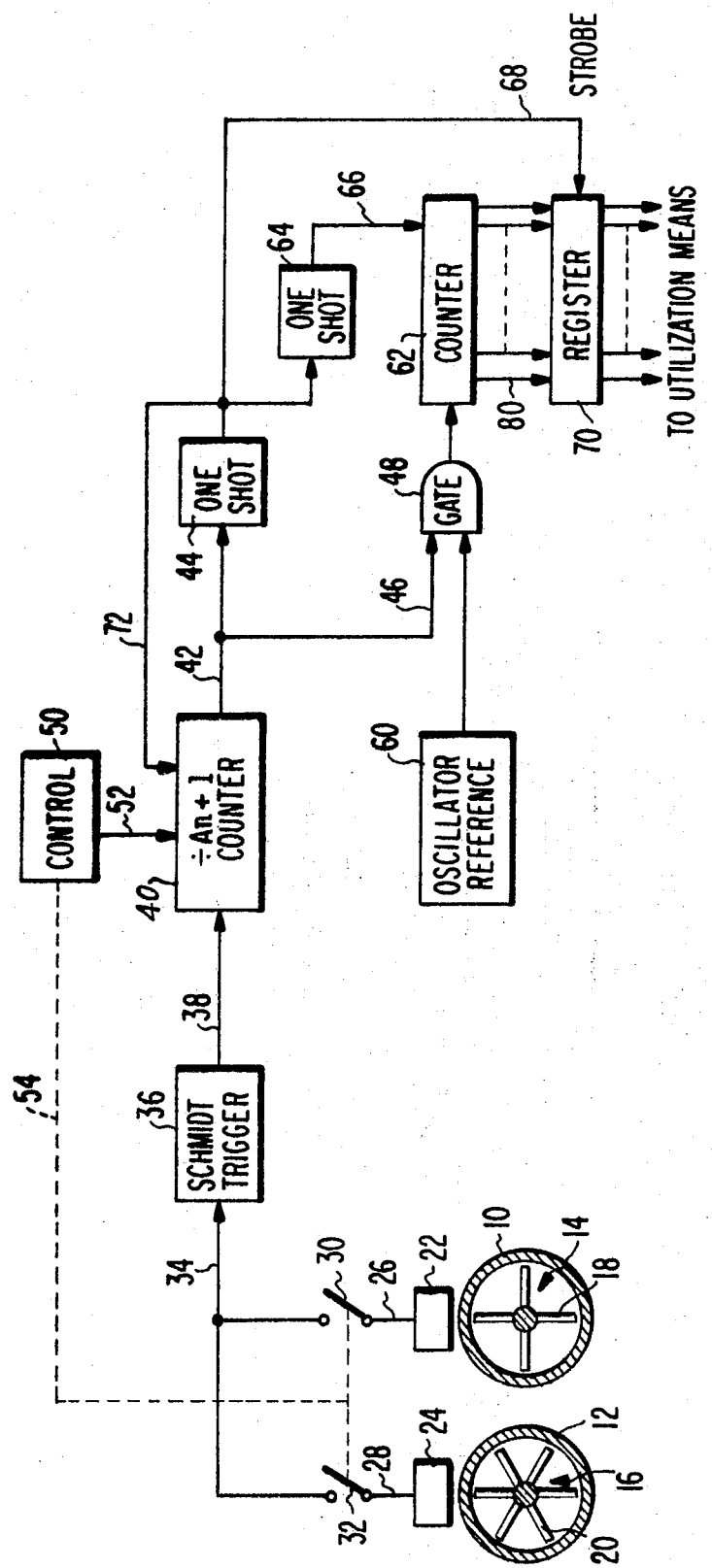

FLOWMETER

This invention relates to flowmeters which measure the quantity and rate of flow of fluids through a conduit or the like.

Turbine flowmeters are conventionally used for the measurement of the rate of flow of virtually any type of gas or liquid, principally for applications requiring high accuracy, repeatability and dependability. Such flowmeters typically utilize a magnetic sensor to develop electrical impulses as each blade of the turbine passes under a magnetic pick-up head disposed adjacent the turbine, the turbine being disposed within the fluid to sense the fluid flow rate. The conventional method of processing this signal is to count the rate of pulses in an electronic counter, measuring the number of pulses occurring during a fixed period of time, usually one second, ten seconds and so forth. The frequency of the pulses is then calibrated to give the flow rate. The number of blades in the turbines varies with design, usually between four and ten blades.

Additionally, in all digital measurements, there is an error due to quantitazation, the ambiguity caused by counting one more or one less event. In a typical frequency measurement application, a flowmeter has a minimum output pulse rate of 100 $H_z$, with a required measurement accuracy of 0.25 percent. It is reasonable to permit quantitazation error to be no greater then 0.05 percent, which dictates that at least 2,000 total counts be taken in each measurement cycle. For this situation, a time base not less than 20 seconds results. To a human observer, the delay of twenty seconds between new measurement data is annoying; for a high performance automatic control system, the time delay is intolerable.

Other techniques which measure the time interval between adjacent rotating blades wherein each blade generates a separate pulse have also met with little success and are limited in their accuracy due to the spacing between turbine blades which is usually not uniform and therefore creates error in the time intervals measured.

SUMMARY OF THE INVENTION

In accordance with the present invention, a flowmeter includes means disposable in a fluid and arranged to rotate at a rate which is a function of the fluid's flow rate. Means are coupled to the rotating means for generating an output signal according to the rotation of the rotating means. The output signal defines at least one time interval which manifests the actual time duration of one or more integral revolutions of the rotating means. The time duration of that one interval is measured. The measured time duration manifests the actual flow rate of that fluid during that interval.

Additionally, a method of measuring the flow rate of a fluid includes the steps of deriving a timing signal from the flow of said fluid by defining a time interval manifesting the actual time duration of one or more integral revolutions of a flowmeter turbine disposed in said fluid, and measuring the time duration of that interval. The measured time duration manifests the actual flow rate during that interval.

The sole FIGURE of the drawing shows diagramatically a flowmeter embodying the present invention.

DETAILED DESCRIPTION

In the drawing, a pair of conduits 10 and 12 contain a fluid which is made to flow into or out of the drawing in the conduits in a conventional manner. The fluid may be, for example, calibration fluid as employed for testing of conventional jet engine accessories. Disposed within conduits 10 and 12 are two turbines 14 and 16, respectively, which are mounted by means (not shown) in a suitable manner. Turbine 14 is shown as having four turbine vanes or blades 18, while turbine 16 is shown as having six turbine vanes or blades 20. Turbines 14 and 16 are rotatably mounted in the fluid stream upon a shaft suitably provided as known in the turbine art. The turbine blades 18 and 20 are conventional vanes as used in flowmeters and can be formed of magnetic material, for example, of soft unmagnetized sheet iron whereas conduits 10 and 12 are typically formed of nonmagnetic material.

Sensors 22 and 24 are each respectively disposed adjacent conduits 10 and 12 as shown and are suitable electromagnet or other devices which produce an output pulse whenever their magnetic field is interrupted as known in this art. Sensors 22 and 24 are suitably mounted by means (not shown) and are each positioned such that magnetic fields established thereby will be intersected by the soft iron of blades 18 and 20 as the respective turbines rotate. The arrangement of sensors 22 and 24 with respect to turbines 14 and 16 is such that a sine wave will be generated at respective output leads 26 and 28 each time one of blades 18 or 20 rotates adjacent to the corresponding respective sensor. Since such an arrangement is known, no further details will be provided of this construction. Output lead 26 is connected to one terminal of a switch 30, and output lead 28 is connected to one terminal of a second switch 32. The other terminals of switches 30 and 32 are connected to lead 34 which is connected to Schmidt trigger circuit 36. The output of Schmidt trigger 36 is applied via lead 38 to divide by $An + 1$ counter 40.

Divide by $An + 1$ counter 40 is a suitable circuit that performs arithmetic division on the stream of pulses applied thereto via lead 38. The (A) term refers to the number of integral revolutions of the turbine disposed in the fluid whose flow rate is then being measured. The (n) term is the number of blades on that turbine. As a result, for a single actual revolution of the four bladed turbine 18, five pulses are successively generated by sensor 22, the first and fifth pulses being generated by the same blade. Thus the time interval between the first and fifth pulses is the actual time duration for the one blade to make one complete revolution.

Additionally, for (A) integral revolutions there will be $An + 1$ pulses successively generated. Here too the first and last pulse of the interval will always be generated by the same blade. It will be appreciated, therefore, that the significance of the divide by $An + 1$ counter is that the first and last pulses for integral (A) revolutions will always be generated by the same blade. Errors introduced by asymmetrical spacing of adjacent blades in a turbine are avoided since only the presence of the other remaining blades is detected and their relative spacing with respect to each other ignored by the flowmeter constructed in accordance with the present invention.

Counter 40 is provided to have as many different counting (dividing) modes of operation as there are different numbers of blades in the different turbines and as there are different (A) number of revolution combinations to be considered. Counter 40, in this case, has two modes of operation, wherein in one mode the counter 40 divides by $n + 1$ with n being four, (A) being one, and in a second mode the counter 40 divides by $n + 1$ with (n) being six and (A) being one, the number of blades in the turbines being four and six, respectively, and the number of revolutions considered being unity. In those instances where division is desired for the pulses generated in two or more revolutions, then counter 40 can be provided with as many modes of operation as needed and desired. For example, the counter may have an operating mode for dividing by $n + 1, 2n + 1, 3n + 1$, and so forth, as desired for a particular application.

The counter performs its division as follows. The output signal applied to lead 42 goes high, for example, upon receipt of the first pulse applied on lead 38. The output signal remains high until receipt of the $An + 1$ pulse which manifests integral complete revolutions of the applicable turbine. At this time the counter output goes low. This is to be distinguished from virtual dividing systems which generate an output pulse in response to a single pulse applied thereto, the output pulse being $An + 1$ times greater in time duration than the single input pulse. The divide by $An + 1$ counter of the present invention performs arithmetic quantitative division based upon quantity of pulses rather than virtual division based upon time duration alone. Thus, the output signal of divide by $An + 1$ counter 40 serves to hold gate 48 open for a time interval equal to $An + 1$ successive input pulses applied on lead 38 which is the actual time duration of integral revolutions of the applicable turbine.

The output of divide by $An + 1$ counter 40 is applied via lead 42 to an input of a monostable multivibrator or one shot 44 as well as to the one input of the gate 48 via lead 46. Control 50 has its output connected to counter 40 by way of lead 52 and is also coupled to switches 30 and 32 by way of dotted line 54. Only one of the switches 30, 32 is open at a time, the other being closed. The switches 30, 32 are operated in ganged relationship by control 50 via line 54. Switches 30 and 32 are ganged together such that at any one time only one of the sensors 22 or 24 is coupled to the input of the Schmidt trigger 36. Schmidt trigger 36 serves to provide an output pulse for each cycle of the sine wave generated by the turbine blade and sensor arrangement.

Control 50 is a suitable device for simultaneously controlling the state of switches 30 and 32 and the state of counter 40 in accordance with the program provided. In the exemplary arrangement shown, when switch 32 is closed and switch 30 is open, counter 40 has a divide by seven mode of operation. When control 50 supplies a signal to switches 30 and 32 to close switch 30 and to open switch 32, then the counter 40 will be switched by a signal applied along lead 52 to a divide by five mode of operation. Thus the output of the counter 40 at lead 42 will be a signal whose transitions define the time interval of the actual time of occurrence of one revolution of either turbine 14 or 16 in accordance with the switch position of switches 30 and 32. It is to be understood that the use of one revolution is exemplary and more than one may be used in accordance with the present invention.

Oscillator 60 serves as a source of suitable high frequency pulses for accurately measuring the time interval between successive transitions in the interval measuring signal on lead 42. The output of oscillator 60 is applied to a second input of AND gate 48, whose output is applied as an input to a counter 62. The output of monostable multivibrator or one shot 44 is applied as an input to a second monostable multivibrator or one shot 64 whose output is applied as a second input to counter 62 via lead 66. The output of one shot 44 is also applied as an input strobe signal along lead 68 to a register 70 and as a reset signal to counter 40 via lead 72. Register 70 is a storage device which upon receipt of a strobe signal stores the count manifested by counter 62. Counter 62 is reset by the signal on lead 66 after register 70 has been strobed at the end of the interval cycle of the respective turbine then being measured.

Counter 62 serves to count each of the oscillations generated by oscillator 60 occurring between transitions of the time interval signal provided at the output of counter 40 at lead 42. The accuracy of the measured time interval defined by the signal at lead 42 is related to the number of pulses or oscillations generated by oscillator 60 within that time interval. The greater the number of counts occurring during an interval, the higher the resolution of the measurement for that time interval. The counter 62 is calibrated to manifest the flow rate of the fluid in conduits 10 and 12. Register 70, when strobed by a signal along lead 68, reads the contents of counter 62 and applies it to utilization means (not shown) for indicating that flow rate.

To provide flexibility in obtaining readings of the flow rates in the various conduits 10 and 12, control 50 can be pre-programmed to automatically and selectively operate switches 30 and 32 in their respective open and closed conditions so as to provide an output at register 70 which gives the flow rate readings for both turbines 14 and 16 in any given sequence. While only two turbines are shown, it is apparent that many more may be utilized in accordance with the present invention. Advantageously, the two turbines may be placed in the same conduit where the flow rate variations exceed the range of the individual turbines. In practice, means (not shown) such as a computer can be fed the count for each single revolution. These counts are then accumulated and averaged by the computer. An average of eight successive measurements has been employed in one application.

Alternatively, while one divide by $An + 1$ counter circuit has been shown, it will be apparent to those skilled in the art that several similar identical counting circuits may be each coupled to a separate conduit and respectively switched on or off at the suitable register such as register 70 for reading the respective counter such as counter 62 in that circuit. These several counting circuits can include separate divide by $An + 1$ counters and Schmidt triggers for each turbine in conjunction with a single counter 62 and register 70.

Thus, there has been shown in accordance with the present invention an apparatus and method for measuring the rate of flow of a fluid. This apparatus and method advantageously provide the flow rate of a fluid during integral revolutions of a turbine. Aditionally, the precision of the flow rate as measured is provided independently of the flow rate. This is accomplished by causing each turbine blade to generate a pulse as a blade rotates past a magnetic pick-up sensor and dividing these pulses by $An + 1$. Any errors that may be present in the actual spaced relationship between turbine blades are not passed along to the flow rate measurement irrespective of which blade is used to start the flow rate measurement. In effect, one pulse is generated whose time duration is substantially the same as the actual duration of integral revolutions of the turbine.

What is claimed is:

1. A flowmeter for measuring the rate of flow of a fluid, comprising:

means including a turbine disposable in the fluid and arranged to rotate at a rate which is a function of said flow rate, said turbine having a plurality of flow responsive blades, blade sensing means coupled to said turbine and responsive to said rotating blades for generating a serial stream of pulses wherein each pulse corresponds to one of said rotating blades, adjacent pulses being generated by adjacent blades, said sensing means including dividing means for dividing said serial stream of pulses by $An + 1$, where A is the integral number of revolutions being measured and n is the number of blades in the turbine, said divided stream of pulses defining at least one time interval manifesting the actual time duration of one or more integral revolutions of said rotating means, and interval measuring means coupled to said signal generating means for measuring the time duration of said one interval, said measured time duration manifesting the actual flow rate of said fluid during that interval.

2. The flowmeter of claim 1 wherein said interval measuring means comprises:

an oscillator for generating an oscillating reference signal, and means including a counter coupled to said oscillator and said dividing means responsive to said oscillating signal and to said divided serial stream of pulses applied thereto for counting the number of oscillations occurring during the time interval manifested by said divided pulses, whereby the count registered by said counter at the end of said interval manifests the fluid flow rate then being measured.

3. A method of measuring the flow rate of a fluid comprising the steps of deriving a timing signal from a time interval manifesting the actual time duration of one or more integral revolutions of a flowmeter turbine disposed in said fluid, and measuring the time duration of said interval, said measured time duration manifesting the actual flow rate during that time interval, said deriving step including generating a pulse in response to each turbine blade rotating adjacent a given point to thereby generate for each revolution of said turbine a plurality of pulses equal to the number of blades plus one in that turbine, and dividing said generated pulses by $An + 1$, where A is the integral number of revolutions being measured and $n$ is the number of blades in that turbine.

4. In a flowmeter for measuring the rate of flow of a fluid including a turbine having a plurality of fluid flow responsive blades disposed in the fluid and arranged to rotate at a rate which is a function of the fluid flow rate, the combination comprising:

means including blade sensing means for generating an output signal in response to the rotation of said blades when said fluid is flowing, said output signal defining at least one time interval manifesting the actual time duration of one or more integral revolutions of said rotating turbine, and interval measuring means coupled to said signal generating means for measuring the time duration of said one interval, said measured time duration manifesting the actual flow rate of said fluid during that interval.

5. A flowmeter for measuring the rate of flow of a fluid comprising:

turbine means disposed in said fluid and arranged to rotate at an angular rate manifesting said rate of flow of fluid, pulse generating means responsive to said rotating turbine means for generating m pulses in a given time interval manifesting one or more integral revolutions of said turbine means where m is an integral number greater than two, and interval measuring means responsive to said generated pulses applied as an input thereto for measuring the time duration of said given time interval, said measuring means including dividing means for dividing said pulses by m to generate a signal manifesting said given time interval, whereby said generated signal manifests the actual flow rate of said fluid during said given time interval.

* * * * *

UNITED STATES PATENT OFFICE
CERTIFICATE OF CORRECTION

Patent No. 3,820,395　　　　　　　　Dated June 28, 1974

Inventor(s) Robert Edward Hartwell

It is certified that error appears in the above-identified patent and that said Letters Patent are hereby corrected as shown below:

After "[76] Inventor: Robert Edward Hartwell, 10 Parlee Road, Chelmsford, Mass. 01824" and before "[22] Filed: May 1, 1972" insert -- [73] Assignee: RCA Corp., Signed and sealed this 26th day of November 1974.

(SEAL)
Attest:

McCOY M. GIBSON JR.　　　　　　　C. MARSHALL DANN
Attesting Officer　　　　　　　　Commissioner of Patents